UNITED STATES PATENT OFFICE.

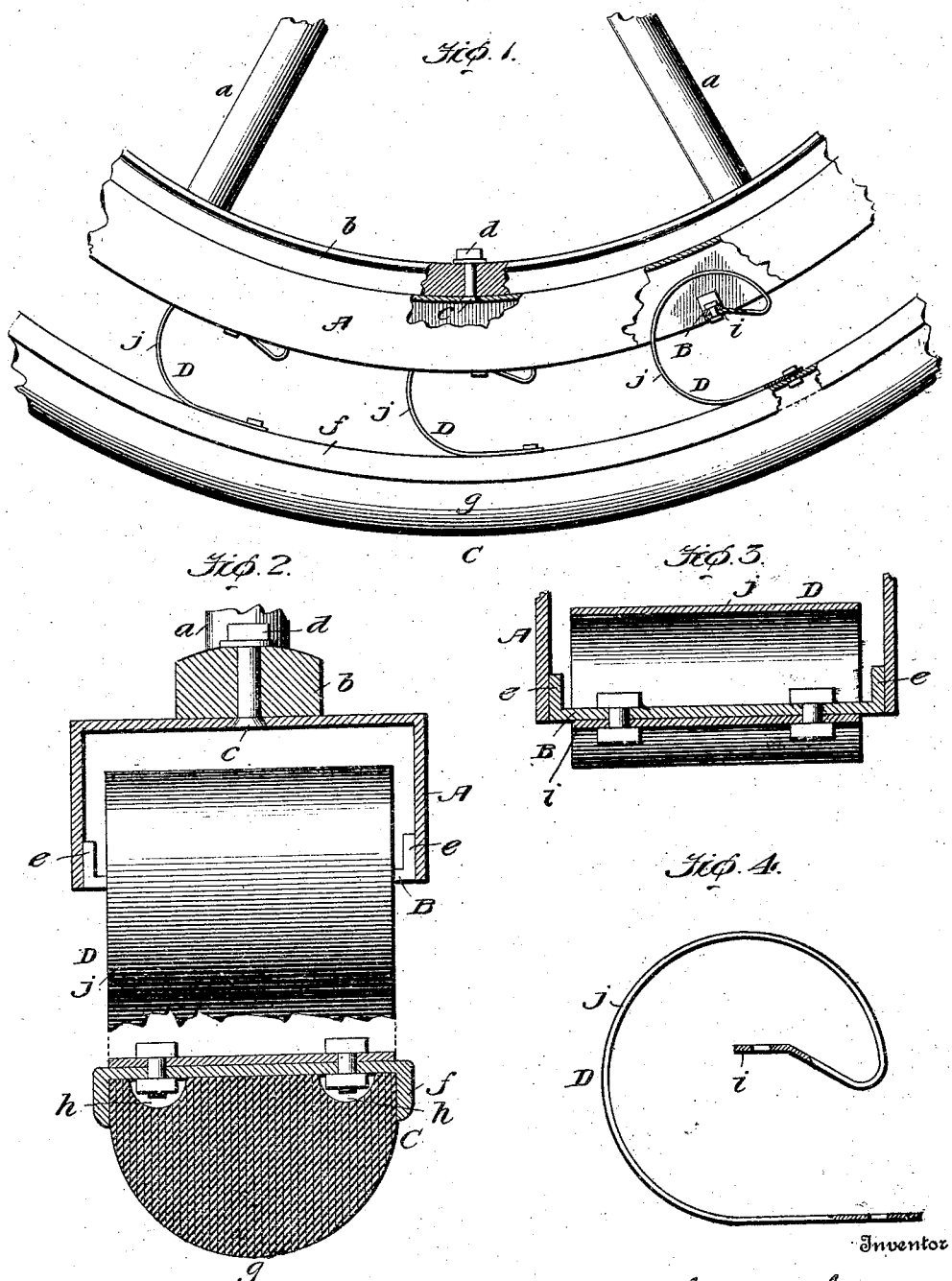

GEORGE E. GARON, OF MANCHESTER, NEW HAMPSHIRE.

TIRE CONSTRUCTION.

937,787.   Specification of Letters Patent.   Patented Oct. 26, 1909.

Application filed December 16, 1908. Serial No. 467,889.

*To all whom it may concern:*

Be it known that I, GEORGE E. GARON, citizen of the United States, residing at Manchester, in the county of Hillsboro and State of New Hampshire, have invented new and useful Improvements in Tire Construction, of which the following is a specification.

My invention relates to spring wheels for automobiles and other vehicles, characterized by tires embodying metallic springs; and it contemplates the provision of a simple, strong and light tire construction, calculated to efficiently cushion the wheel on which it is arranged, and prevent the transmission thereto of shock and jar.

Other advantageous features of the invention will be fully understood from the following description and claim when the same are read in connection with the drawings, accompanying and forming part of this specification, in which:

Figure 1 is a view of a portion of a wheel equipped with the tire construction constituting the best practical embodiment of my invention of which I am aware. Fig. 2 is an enlarged transverse section taken through the tire construction and the adjacent portion of the wheel. Fig. 3 is a detail transverse section illustrative of the arrangement of one cross-bar and one spring in the inner channel member of the construction. Fig. 4 is a side elevation of one of the springs comprised in the construction, removed.

Similar letters of reference designate corresponding parts in all of the views of the drawings.

The wheel to which my improvements are applied may be and preferably is of the ordinary well known construction in that it comprises spokes $a$ and felly $b$. My novel tire construction is arranged and secured on the felly $b$, and is made up of a channel member A, of suitable metal, having cross-bars B at suitable intervals, a rim C surrounding and separated by an intervening space from the channel member, and metallic springs D interposed between and connected with the cross-bars B of the channel member and the rim C and having for their purpose to prevent the transmission of shock and jar from the rim to the remainder of the wheel. The connection between the channel member A and the felly is preferably effected through the medium of bolts $c$ and nuts $d$, and the channel member A is of greater width than the felly in about the proportion illustrated, so as to contribute to the provision of the desirable broad tread on the wheel. As best shown in Figs. 2 and 3, the cross-bars B of the channel member are provided with angular end portions $e$ which are arranged at the inner sides of the outer portions of the side walls of the channel member and are fixed in any approved manner thereto.

The rim C may be of any construction compatible with the purpose of my invention, though I prefer to have it comprise a flanged metallic portion $f$, and a tire $g$, suitably secured in or to the metallic portion and formed of canvas and rubber or of any other resilient material suitable to the purpose. At its inner side the tire $g$ is recessed, as indicated by $h$ to receive the nuts on the bolts employed in the connection of the outer ends of the springs to the rim.

Inasmuch as the springs are identical in construction and are connected in a similar manner with the channel member A, a detailed description of the spring shown in Figs. 2 and 4 will suffice to impart a definite understanding of all of the springs. The said spring, Figs. 2 and 4, is of a slightly less width than the channel member A, and comprises an inner straight portion $i$ arranged at the outer side of and bolted or otherwise fixedly connected to the outer side of one of the cross-bars B, and a major portion $j$ which is carried in a curved manner inwardly and about the said cross-bar B— *i. e.*, between the bar B and the inner transverse wall of the channel member A, and is connected at its outer end with the rim C, preferably through the medium of bolts extending through the spring and the metallic portion $f$ of the rim, and having nuts disposed in the before mentioned recesses $h$ of the tire $g$.

The several springs D are spaced apart, as shown in Fig. 1, and by virtue of the described relative arrangement of the channel member, springs and rim, it will be manifest that the springs will enable the rim to pass over stones and rough places in a roadway without the transmission of shock and jar to the remainder of the wheel; also, that the arrangement of a considerabl portion of each spring in the channel member A increases the resiliency of the spring and lends strength thereto, and at the same time the spring is held against undue lateral deflection, with the result that the rim under ordinary conditions is retained in vertical alinement with the remainder of the wheel and yet when necessity demands is enabled to move laterally to a limited extent so as to clear stones and other obstructions in its path. It will further be observed in this connection that the channel member A holds the springs against undue lateral movement and avoids the imposition of undue strain on the spring when the vehicle equipped with the wheel is making a turn.

In addition to the practical advantages hereinbefore ascribed to my improvements, it will be noted that the tire construction is simple and inexpensive, and therefore obviates the necessity of employing a pneumatic or analogous tire, without unduly increasing the cost of the wheel.

As before stated, the construction herein illustrated and described constitutes the best practical embodiment of my invention of which I am cognizant, but it is obvious that in the future practice of the invention various changes in the form, construction and relative arrangement of parts may be made within the scope of my claim appended. Moreover it will be appreciated that my novel tire construction will avoid accidents, for it will not puncture, blow-out or get out of order under a vehicle traveling at a high rate of speed as will pneumatic tires which cause a large proportion of automobile accidents; that the construction is calculated to absorb the shocks at sprocket and transmission gear and prevent stripping of the same; that the construction will not require repairing and so will do away with all tire troubles; and that the springs D are formed and arranged to equally help one another in absorbing shocks.

Having described my invention, what I claim and desire to secure by Letters-Patent, is:

A tire construction comprising a channel member, cross bars extending between the outer portions of the side walls of the channel member at intervals and having inwardly directed portions arranged against and permanently connected to the inner sides of said side walls, a metallic rim surrounding and separated by an intervening space from the channel member and having outwardly directed side flanges and also having a tire, of resilient material, secured between the said side flanges, and springs, of a less width than the space between the side walls of the channel member and arranged at equal distances from said side walls; the said springs being each connected adjacent to one of its ends to the outer side of one cross bar of the channel member, and each having a straight portion, extending outwardly beyond the channel member, and a curved portion extending inwardly through the space between the bar and the inner, transverse wall of the channel member and then outwardly beyond the channel member and connected adjacent its outer end to the inner side of the metallic rim.

In testimony whereof I have hereunto set my hand in presence of two subscribing witnesses.

GEORGE E. GARON.

Witnesses:
J. A. BIVIN,
A. M. GILBERT.